Nov. 25, 1952　　　L. M. GOLDSTINE　　　2,618,987
STEERING WHEEL COVER
Filed Feb. 17, 1950
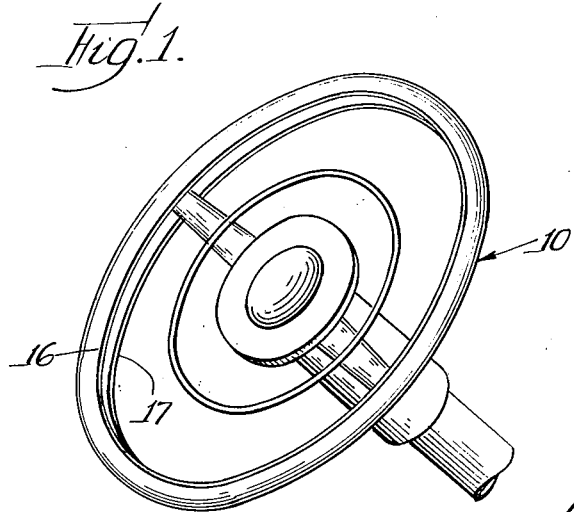
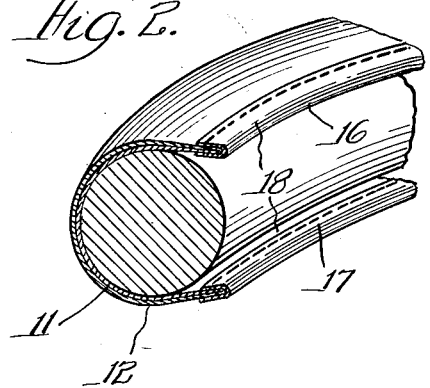
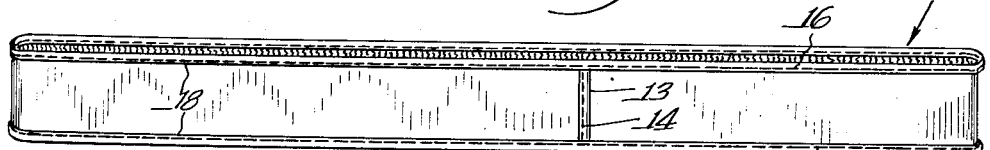
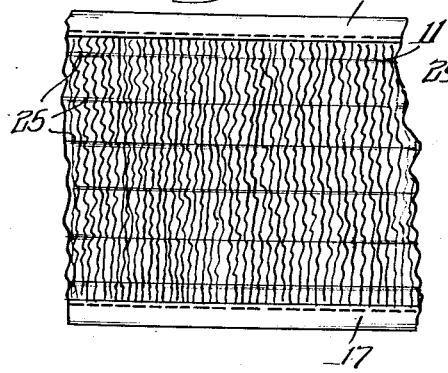
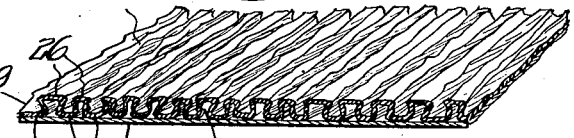
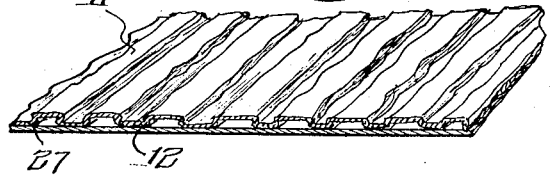
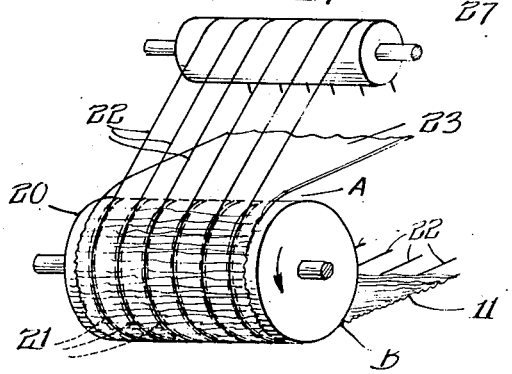
INVENTOR.
Lee M. Goldstine
BY
McLaughlin & Wallenstein
Attys.

Patented Nov. 25, 1952

2,618,987

UNITED STATES PATENT OFFICE 2,618,987

STEERING WHEEL COVER

Lee M. Goldstine, Chicago, Ill.

Application February 17, 1950, Serial No. 144,635

4 Claims. (Cl. 74—558)

My invention relates to improvements in steering wheel covers for use on steering wheels of automobiles and other vehicles.

Various types of steering wheel covers have heretofore been suggested among which have been those made entirely of rubber, those made of loosely woven cloth having a layer of rubber on the inner surface thereof, and, more recently, those comprising an endless band of layers of a plastic material sewed together by stitching extending diagonally across the band in both directions. Each of the types heretofore known has a number of objections with which those versed in the art are familiar and which, therefore, require no elaboration. Thus, for example, in the last-mentioned type, when the band is stretched to place it in position on the steering wheel and after it has been in use for only a relatively short time, the diagonal stitching tears and the useful life of such a cover is, therefore, very limited.

In accordance with my invention, a new and highly useful automobile steering wheel cover has been evolved which possesses a number of marked advantages over those heretofore known. Steering wheel covers made pursuant to my invention are characterized by great sturdiness, by simplicity in manufacture, they are easily applied to the steering wheel, and they possess the added advantage of being highly ornamental.

The nature of my present invention will best be understood in conjunction with the following description and the accompanying drawing wherein, Fig. 1 is a perspective view of a conventional steering wheel with the cover of my invention shown in place thereon;

Fig. 2 is a partial perspective view, in enlarged form, showing the manner in which the cover is positioned on the steering wheel;

Fig. 3 is a perspective view of a preferred form of the cover of my invention;

Fig. 4 is a plan view, in enlarged form, of one flat surface of the cover;

Fig. 5 is a longitudinal edge and partial perspective view in enlarged or exaggerated form for illustration purposes showing the arrangement of the puckered or pleated surface;

Fig. 6 is a view similar to that of Fig. 5 but in which the band is stretched longitudinally as when it is placed in position on the steering wheel;

Fig. 7 is a schematic view showing one way in which the puckered or pleated surface on the band 11 may be formed.

As shown in the drawings, the steering wheel cover, denoted generally by the numeral 10, is made from two bands, 11 and 12, which, for convenience, may be referred to as inner and outer bands, respectively. The bands are made from an elastic synthetic thermoplastic material in film or sheet form, for example, polyvinyl alcohol, polyamides, rubber hydrochloride, polyvinylidene chloride-acrylonitrile, vinyl chloride-acetate copolymers, polyvinylidene chloride, polyvinyl chloride, or the like. While varying film thicknesses may be utilized, good results are obtained with films having a thickness of 0.003 to 0.008 inch.

The band 12 may have a flat, unornamented surface. The band 11, however, is so constructed that, in the finished cover, it will have a puckered or pleated exposed outer surface. The bands 11 and 12 are heat-sealed to each other and, therefore, provide a unitary band of very high strength characteristics. The free ends of the heat-sealed laminated strip comprising the bands 11 and 12 are brought together, turned inwardly, and covered with a narrow strip 13 of a synthetic plastic. The strip 13 may be heat sealed or stitched, as shown at 14, whereby the endless band is formed. Encompassing the longitudinal edges of the bands 11 and 12 are longitudinal narrow edge binding strips 16 and 17 which are advantageously made of a synthetic plastic having elastic or stretch characteristics. The binding strips 16 and 17 may be made from a thermoplastic material and may be heat-sealed around the longitudinal edges of the laminated bands 11 and 12. In the drawings, however, I have shown said bands 16 and 17 as being sewed or stitched into position. The stitching 18 should be selected to have good strength and somewhat elastic properties.

The manner of forming the puckered or pleated surface of the band 11 and the bonding or laminating of the bands 11 and 12 form no part of my present invention. These operations may be carried out in a number of ways. One convenient procedure, illustrated schematically in Fig. 7, is to provide a heated cylindrical drum having a series of spaced annular grooves 21 in the surface thereof within which piano type wires 22 are disposed so that tension can be exerted on the wires. A sheet of plastic material 23 is fed, in continuous manner from a roll (not shown), at A between the drum 20 and the wires 22. The drum 20 and the wires 22 travel in the same direction, as indicated by the arrows, but the wires 22 travel at a greater rate of speed than the speed of rotation of the drum 20. This results in causing the sheet of plastic material 23 to pucker or pleat, the puckers or pleats running in a direction transverse to the length of the sheet. When the sheet 23 passes out at B, it is backed with crepe paper which assists in maintaining the puckers or pleats until the sheet cools whereupon the puckers or pleats are firmly set.

The puckered or pleated sheet is then bonded to or laminated with another, preferably flat, sheet of thermoplastic synthetic elastic plastic in any desired manner. Again, this may be done conveniently by the same arrangement shown in Fig. 7. In this case, the two sheets to be laminated are fed between the heated drum and the spaced wires but the drums and the wires are driven at the same rate of speed. The heat sealing takes place at the areas where the wires touch the plastic. In other words, the sealing is along the narrow longitudinal lines 25, as shown in Fig. 4. The laminated sheets may then be cut into strips of the desired length and width which, in the usual case, will be about 22¾ inches in length and 2½ inches in width.

As best shown in Figs. 5 and 6, it will be observed that the puckers or pleats comprise generally randomly arranged spaced raised portions 26, having walls 27 somewhat inwardly extending in the direction of the band 12, the bonding between the bands 11 and 12 occurring through the medium of the narrow webs 28 caused by the indentations of the wires along the longitudinal lines 25. The raised portions 26, the walls 27, and the webs 28 define non-uniform air pockets. When the cover is stretched to place it on the steering wheel, the effect is to extend the walls 27, as indicated in Fig. 6, so that said walls are straightened out or so that they diverge away from, instead of towards, each other in the direction of the band 12. The high degree of stretch and the differential stretch serve to cause the band to hug the steering wheel closely so that there is no slippage thereon.

It will be seen, therefore, that I have devised a sturdy automobile steering wheel cover having a number of marked advantages over those heretofore known. While, for example, the band 12 is desirably flat, it tends to acquire a crinkly appearance by reason of the manner of manufacture of the band. This crinkly appearance adds to the ornamental appearance of the cover although I predicate no invention thereon. The cover may be placed on the steering wheel with either the band 11 or the band 12 on the outside, as desired, and the bands 11 and 12 may be made of the same or different colors to obtain various pleasing ornamental effects. In certain cases, instead of using a flat or unornamented band 12 in combination with the band 11, I may bond two bands together, each of which has the puckered or pleated construction described in relation to band 11.

While I have described my invention in detail, the scope of the invention is not to be limited to the exact details disclosed since the invention may take various forms within the scope of the appended claims in the light of the guiding teachings set forth herein.

What I claim as new and desire to secure by Letters Patent of the United States is:

1. An endless steering wheel cover comprising inner and outer bands of elastic synthetic thermoplastic material heat sealed to each other along longitudinally spaced narrow areas, at least one of said bands being provided on its exposed surface with generally randomly arranged spaced raised portions which serve to impart a puckered or pleated appearance to said last-mentioned surface.

2. An endless steering wheel cover comprising inner and outer bands of elastic synthetic thermoplastic material heat sealed to each other along longitudinally spaced narrow areas, at least one of said bands being provided on its exposed surface with generally randomly arranged spaced raised portions which serve to impart a puckered or pleated appearance to said last-mentioned surface, and longitudinal narrow edge binding strips of said elastic synthetic thermoplastic material encompassing the longitudinal edges of said bands.

3. An endless steering wheel cover comprising inner and outer bands of elastic synthetic thermoplastic material heat sealed to each other along longitudinally spaced narrow areas, one of said bands having a substantially flat exposed surface and the other of said bands being provided on its exposed surface with generally randomly arranged spaced raised portions which serve to impart a puckered or pleated appearance to said last-mentioned surface, and longitudinal narrow edge binding strips of said elastic synthetic thermoplastic material encompassing the longitudinal edges of said bands.

4. An endless steering wheel cover comprising inner and outer bands of elastic synthetic thermoplastic material heat sealed to each other along longitudinally spaced narrow areas, one of said bands having a substantially flat exposed surface and the other of said bands being provided on its exposed surface with generally randomly arranged spaced raised portions which serve to impart a puckered or pleated appearance to said last-mentioned surface, and longitudinal narrow edge binding strips of said elastic synthetic thermoplastic material encompassing the longitudinal edges of said bands and sewed thereto by longitudinally disposed stitching having elastic characteristics.

LEE M. GOLDSTINE.

REFERENCES CITED

The following references are of record in the file of this patent:

UNITED STATES PATENTS

| Number | Name | Date |
| --- | --- | --- |
| 2,176,019 | Cohoe | Oct. 10, 1939 |
| 2,299,988 | Irving | Oct. 27, 1942 |
| 2,440,039 | Brown | Apr. 20, 1948 |
| 2,491,803 | De Heras et al. | Dec. 20, 1949 |